(12) United States Patent
Yao et al.

(10) Patent No.: US 10,451,928 B2
(45) Date of Patent: Oct. 22, 2019

(54) DISPLAY PANEL AND DISPLAY DEVICE

(71) Applicant: Shanghai Tianma Micro-Electronics Co., Ltd., Shanghai (CN)

(72) Inventors: Qijun Yao, Shanghai (CN); Yong Yuan, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 129 days.

(21) Appl. No.: 15/865,168

(22) Filed: Jan. 8, 2018

(65) Prior Publication Data

US 2018/0129091 A1  May 10, 2018

(30) Foreign Application Priority Data

Sep. 28, 2017 (CN) .......................... 2017 1 0897239

(51) Int. Cl.
  *G02F 1/1339* (2006.01)
  *G02F 1/1333* (2006.01)
  *G06F 3/044* (2006.01)
  G02F 1/1335 (2006.01)
  G02F 1/1343 (2006.01)
  H01L 27/32 (2006.01)

(52) U.S. Cl.
  CPC ...... *G02F 1/13394* (2013.01); *G02F 1/13338* (2013.01); *G06F 3/044* (2013.01); G02F 1/133514 (2013.01); G02F 1/134309 (2013.01); G02F 2201/121 (2013.01); G02F 2201/123 (2013.01); G06F 2203/04105 (2013.01); H01L 27/323 (2013.01)

(58) Field of Classification Search
  None
  See application file for complete search history.

(56) References Cited

U.S. PATENT DOCUMENTS

| 8,134,652 | B2 * | 3/2012 | Rho | .................... G02F 1/13338 |
| | | | | 345/173 |
| 2006/0227271 | A1 * | 10/2006 | Park | .................... G02F 1/13394 |
| | | | | 349/130 |
| 2011/0141058 | A1 * | 6/2011 | Onaka | .................... G06F 3/045 |
| | | | | 345/174 |
| 2019/0025970 | A1 * | 1/2019 | Kim | .................. G02F 1/133528 |

* cited by examiner

*Primary Examiner* — Duane N Taylor, Jr.
(74) *Attorney, Agent, or Firm* — Alston & Bird LLP

(57) ABSTRACT

The present disclosure provides a display panel and a display device. The display panel includes: at least one pressure sensor; a first substrate on which a plurality of supporting spacers are disposed; and a second substrate disposed opposite to the first substrate, wherein a plurality of protrusions are disposed on the second substrate, the protrusions correspond to and contact the supporting spacers, respectively, a surface of the protrusion close to the corresponding supporting spacer is defined as a first contact surface, the second substrate further comprises a protrusion-free region surrounding the protrusion, and a roughness of the first contact surface is greater than a roughness of the surface of the protrusion-free region.

18 Claims, 20 Drawing Sheets

DISPLAY PANEL AND DISPLAY DEVICE

CROSS-REFERENCE TO RELATED APPLICATIONS

This application claims priority to a Chinese patent application No. CN201710897239.7 filed on Sep. 28, 2017, the disclosure of which is incorporated herein by reference in its entirety.

TECHNICAL FIELD

The present disclosure relates to pressure touch technologies, in particular to a display panel and a display device.

BACKGROUND

At present, display panels integrated with touch electrodes are widely applied in various electronic devices, e.g. mobile phones, tablet computers and kiosks. As such, a user may perform the operations on the electronic devices by merely touching icons displayed on the electronic devices using his finger, so that the user does not need other input devices (e.g. keyboards and mouses), thereby making a human-machine interaction easier.

In order to better meet the requirements for the user, a pressure sensor is commonly integrated into the display panel to detect the magnitude of the touch pressure when the user touches the display panel, thereby improving the applied range of touch technologies. In the prior art, the display panel is provided with a supporting spacer for making the thickness of the liquid crystal box unchanged. When the user performs a pressure touch operation, the pressing force applied to the liquid crystal display panel causes the supporting spacer to contact an opposing substrate, thereby achieving a supporting function. However, under different pressing forces, there will be different degrees of sliding between the supporting spacer and the opposing substrate, resulting in a drift on a baseline of the pressure sensor during the pressure detection.

BRIEF SUMMARY

The embodiments of the present disclosure provide a display panel and a display device in order to lower a drift on the baseline of the pressure sensor during the pressure detection.

In a first aspect, the embodiments of the present disclosure provide a display panel, the display panel comprises: at least one pressure sensor; a first substrate on which a plurality of supporting spacers are disposed; and a second substrate disposed opposite to the first substrate, wherein a plurality of protrusions are disposed on the second substrate, the protrusions correspond to and contact the supporting spacers, respectively, a surface of the protrusion close to the corresponding supporting spacer is defined as a first contact surface, the second substrate further comprises a protrusion-free region surrounding the protrusion, and a roughness of the first contact surface is greater than a roughness of the surface of the protrusion-free region.

According to a second aspect, the embodiments of the present disclosure further provide a display device, where the display device comprises the display panel according to the first aspect.

With the embodiments of the present disclosure, a display panel includes at least one pressure sensor; a first substrate on which a plurality of supporting spacers are disposed; and a second substrate disposed opposite to the first substrate, wherein a plurality of protrusions are disposed on the second substrate, the protrusions correspond to and contact the supporting spacers, respectively, a surface of the protrusion close to the corresponding supporting spacer is defined as a first contact surface, the second substrate further comprises a protrusion-free region surrounding the protrusion, and a roughness of the first contact surface is greater than a roughness of the surface of the protrusion-free region, so that the friction between the supporting spacer and the opposing substrate is increased, thereby lowering a drift on the baseline of the pressure sensor during the pressure detection.

BRIEF DESCRIPTION OF DRAWINGS

Other features, objects, and advantages of the disclosure will become more apparent upon reading the detailed description of the non-limiting embodiments in conjunction with the following drawings, in which.

DETAILED DESCRIPTION

Figure 1:
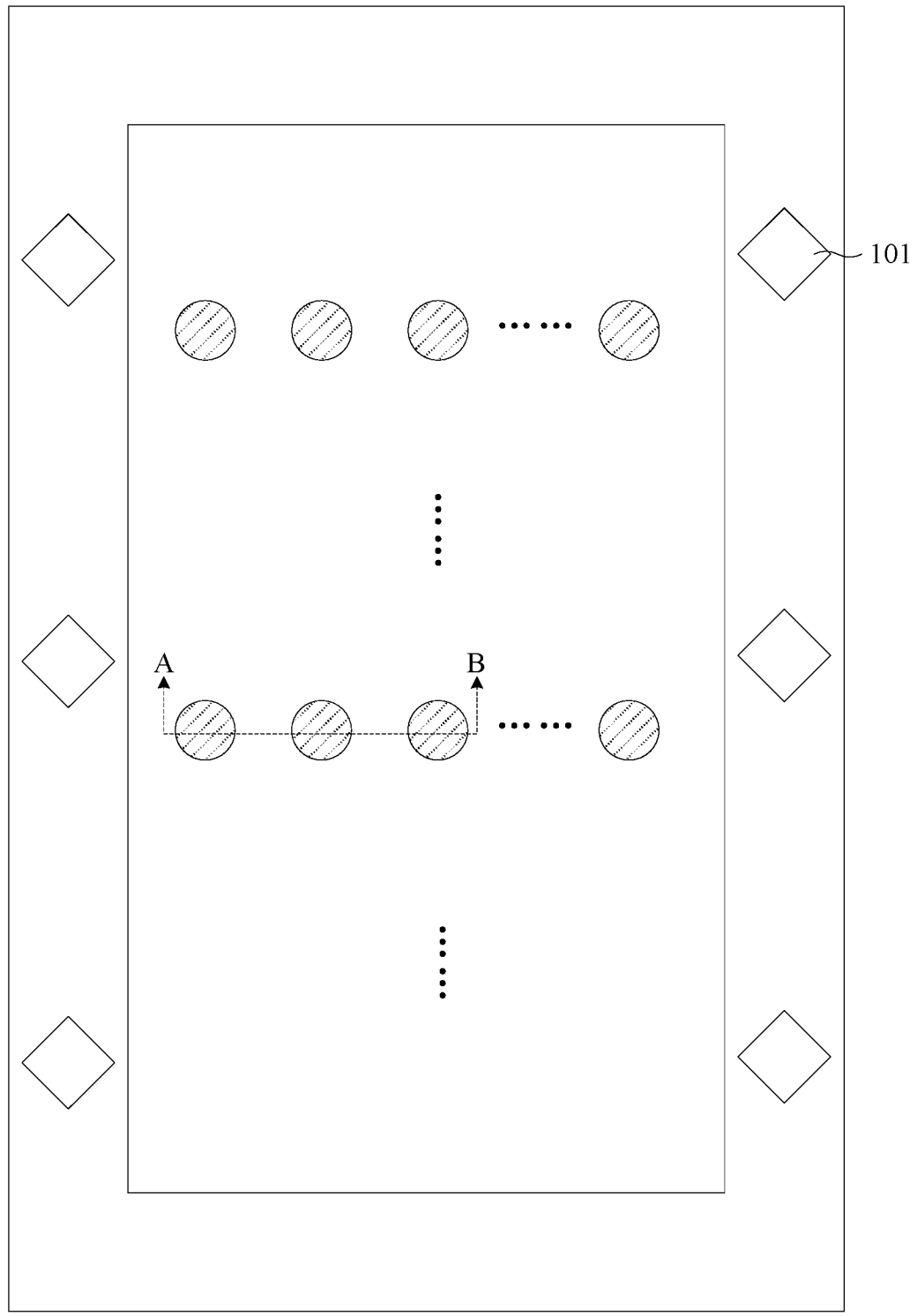
FIG. 1 is a schematic structural view of a display panel according to an embodiment of the present disclosure.

In order to further illustrate the technical means and efficacy of the present disclosure, the specific implementation, structures, features and effects of a display panel and a display device according to the present disclosure will be described below with reference to the accompanying drawings and the embodiments, as described in detail later.

The embodiments of the present disclosure provide a display panel. The display panel includes: at least one pressure sensor; a first substrate on which a plurality of supporting spacers are disposed; and a second substrate disposed opposite to the first substrate, wherein a plurality of protrusions are disposed on the second substrate, and the protrusions correspond to and contact the supporting spacers, respectively. A surface of the protrusion close to the corresponding supporting spacer is defined as a first contact surface, the second substrate further comprises a protrusion-free region surrounding the protrusion, and a roughness of the first contact surface is greater than a roughness of the surface of the protrusion-free region.

With the embodiments of the present disclosure, a display panel includes at least one pressure sensor; a first substrate on which a plurality of supporting spacers are disposed; and a second substrate disposed opposite to the first substrate. A plurality of protrusions are disposed on the second substrate. The protrusions correspond to and contact the supporting spacers, respectively. A surface of the protrusion close to the corresponding supporting spacer is defined as a first contact surface. The second substrate further comprises a protrusion-free region surrounding the protrusion, and a roughness of the first contact surface is greater than a roughness of the surface of the protrusion-free region, so that the friction between the supporting spacer and the opposing substrate is increased, thereby lowering a drift on the baseline of the pressure sensor during the pressure detection.

The core idea of the present application is mentioned above. The technical solutions in the embodiments of the present disclosure will be described clearly and completely below with the embodiments of the present disclosure with reference to the accompanying drawings. The described embodiments are merely some of the embodiments of the present disclosure rather than all of the embodiments. All other embodiments obtained by those of ordinary skill in the art based on the embodiments of the present disclosure without any creative effort shall fall within the protection scope of the present disclosure.

Many specific details will be illustrated in the description below for fully understanding the disclosure; however, the disclosure may also be implemented in other embodiments different from those described herein. It may be similarly extended by one skilled in the art without departing from the spirit of the disclosure. Therefore, the disclosure will not be limited to the embodiments disclosed below.

Next, the disclosure will be described in detail in conjunction with the drawings. In the description of the embodiments of the disclosure, for easy illustration, schematic diagrams showing the structure of a device are not partially enlarged to scale. Moreover, the schematic diagrams are exemplary only, without limiting the protection scope of the disclosure. Additionally, three-dimensional space sizes of length, width and height should be included in practical manufacture.

Figure 2:
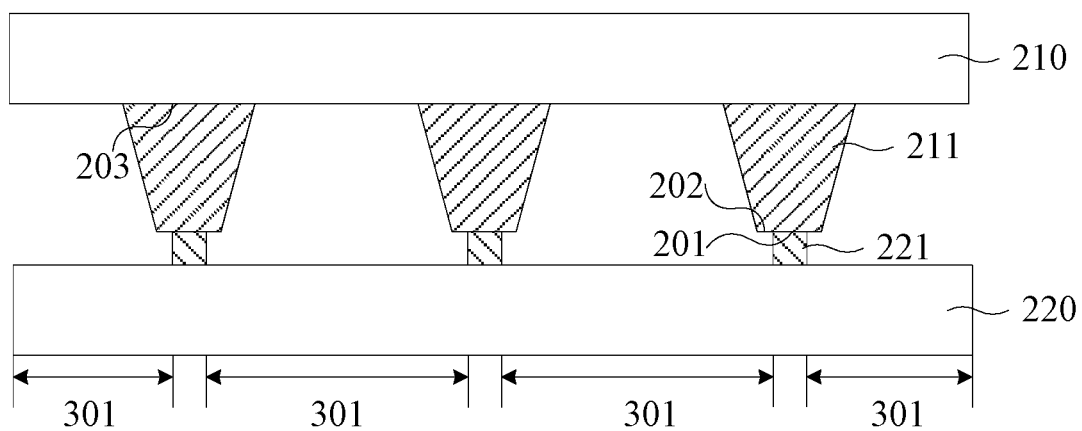
FIG. 2 is a schematic structural view of the cross-section along the dashed line AB in FIG. 1.

FIG. 1 is a schematic structural diagram showing a display panel according to an embodiment of the present disclosure. Referring to FIG. 1, the display panel includes at least one pressure sensor 101. FIG. 2 is a schematic structural view of the cross-section along the dashed line AB in FIG. 1. Referring to FIG. 2, the display panel includes a first substrate 210 on which a plurality of supporting spacers 211 are disposed; the display panel further includes a second substrate 220 disposed opposite to the first substrate 210. A plurality of protrusions 221 are disposed on the second substrate 220. The protrusions 221 correspond to and contact the supporting spacers 211, respectively. A surface of the protrusion 221 close to the corresponding supporting spacer 211 is defined as a first contact surface. The second substrate 220 further includes a protrusion-free region 301 surrounding the protrusion 221. A roughness of the first contact surface 201 is greater than a roughness of the surface of the protrusion-free region 301. Herein, the surface roughness refers to the small pitch present in the machined surface and the uneven degree of the tiny peak-valley. The smaller the surface roughness is, the smoother the surface will be.

It should be noted that FIG. 1 only exemplarily illustrates that the display panel includes six pressure sensors 101 disposed in a non-display region, rather than limiting the number of the pressure sensors 101 and the disposed positions thereof. The number of the pressure sensors 101 and the disposed positions thereof can be reasonably adjusted by the operators according to actual requirements.

It should also be noted that the supporting spacers 211 and the protrusions 221 shown in FIG. 1 and FIG. 2 are arranged in a matrix. In other implementations of this embodiment, the supporting spacers 211 and the protrusions 221 may also be arranged in other manners, as long as the display panel can be displayed normally, which is not specifically limited in this embodiment.

In addition, the protrusion-free region 301 surrounding the protrusion 221 refers to an area within a certain range around the protrusion 221 where there are no other protrusions. In the case that no protrusion is provided in the prior art, the roughness at the position where the protrusion 221 is located is the same as the roughness at the region around the position, and the friction force at the contact interface between the supporting spacer 211 and the second substrate 220 is small. In this embodiment, the protrusion 221 is provided and the roughness of the first contact surface 201 of the protrusion 221 is increased. Compared with the prior art, the friction force at the contact interface between the supporting spacer 211 and the second substrate 220 is increased according to this embodiment of the present disclosure.

The display panel according to this embodiment of the present disclosure includes at least one pressure sensor 101; a first substrate 210 on which a plurality of supporting spacers 211 are disposed; and a second substrate 220 disposed opposite to the first substrate 210. A plurality of protrusions 221 are disposed on the second substrate 220. The protrusions 221 correspond to and contact the supporting spacers 211, respectively. A surface of the protrusion 221 close to the corresponding supporting spacer 211 is defined as a first contact surface. The second substrate 220 further includes a protrusion-free region 301 surrounding the protrusion 221. A roughness of the first contact surface 201 is greater than a roughness of the surface of the protrusion-free region 301. The pressure sensor 101 provided by the embodiment of the present disclosure is a strain-type pressure sensor. The basic principle of detecting pressure is as follows. When a pressure is applied to a certain position on the display panel, the pressure sensor 101 detects a stress at the position of thereof which is caused by the pressure. Under the action of the stress, the pressure sensor 101 is deformed, so that the resistance of the pressure sensor 101 changes and the output value of the pressure sensor 101 changes. Based on this change, the pressure applied to the display panel can be calculated. When the pressure sensor 101 is unstressed, the output value of the pressure sensor 101 is the baseline of the pressure sensor 101. Hence, the variation of the output value of the pressure sensor 101 is calculated as: the difference between the output value when the pressure sensor 101 is stressed and the baseline. It can be seen from the above that if the base line of the pressure sensor 101 has drifted, the calculated value of the pressure is inaccurate when the pressure sensor 101 is stressed (that is, when the pressure is applied on the display panel), so that the accuracy of the pressure sensor 101 for detecting the pressure is not high. In the prior art, the friction force between the supporting spacer 211 and the opposing substrate is small. When the user performs the pressure touch operation, the pressing force applied to the display panel causes a relative displacement between the supporting spacer 211 and the opposing substrate, and at least part of the relative displacement is retained after the pressure is removed by the user, and hence the display panel cannot completely recover to its original state, so that the stress in the pressure sensor 101 cannot be completely eliminated, and the deformation thereof cannot be completely returned, thus resulting in a drift on the baseline of the pressure sensor 101 disposed in the display panel during the pressure detection. In the above technical solution provided in this embodiment, the friction force between the supporting spacer 211 and the opposing substrate is increased, so there is less likely to be relative displacement between the supporting spacer 101 and the opposing substrate in the case of the action of the touch operation from the user. After the pressing force is removed by the user, the display panel is more easily to be restored to the original state, which helps to eliminate the stress inside the pressure sensor 101, thereby lowering the drift on the baseline of the pressure sensor 101 during the press detection.

Optionally, still referring to FIG. 2, a surface of the supporting spacer 211 close to the protrusion 221 is defined as a second contact surface 202. A vertical projection of the first contact surface 201 on the first substrate 210 may be located in a vertical projection of the second contact surface 202 on the first substrate 210.

It should be noted that, as shown in FIG. 1 and FIG. 2, the shape of the supporting spacer 211 may be a frustum, and in other implementations of this embodiment, the shape of the supporting spacer 211 may also be a cylinder or the like. Since the frictional force between the supporting spacer 211 and the corresponding protrusion 221 is related to the parameter of the contact interface between the second contact surface 202 and the first contact surface 201, this embodiment mainly focuses on the second contact surface 202 of the supporting spacer 211 regardless of the shape of the supporting spacer 211.

It should also be noted that, in the case where the protrusion 221 is not provided in the prior art, the second contact surface 202 of the supporting spacer 211 would directly contact the upper surface of the second substrate 220 so that the area of the contact interface between the supporting spacer 211 and the second substrate 220 is equal to the area of the second contact surface 202. In this embodiment, the protrusion 221 is provided. As shown in FIG. 2, since the area of the first contact surface 201 is smaller than the area of the second contact surface 202, the area of the contact interface between the supporting spacer 211 and the second substrate 220 is equal to the area of the first contact surface 201. When the total number of the supporting spacers 211 in the display panel is given, the total area of the contact interfaces between the supporting spacers 211 and the second substrate 220 in the display panel in which the protrusion 221 is provided is smaller than that in the prior art, so that when the same pressing force is applied, the intensity of the pressure acting on the display panel is larger compared with that in the prior art, causing deformation of the display panel and hence affecting the normal operation of the display panel. Therefore, in order to solve the above problem, in this embodiment, the number of the supporting spacers 211 is increased and the number of the protrusions 221 is correspondingly increased so that when the same pressing force is applied, the intensity of the pressure acting on the display panel is equal to that acting on the display panel in the prior art.

Figure 3:
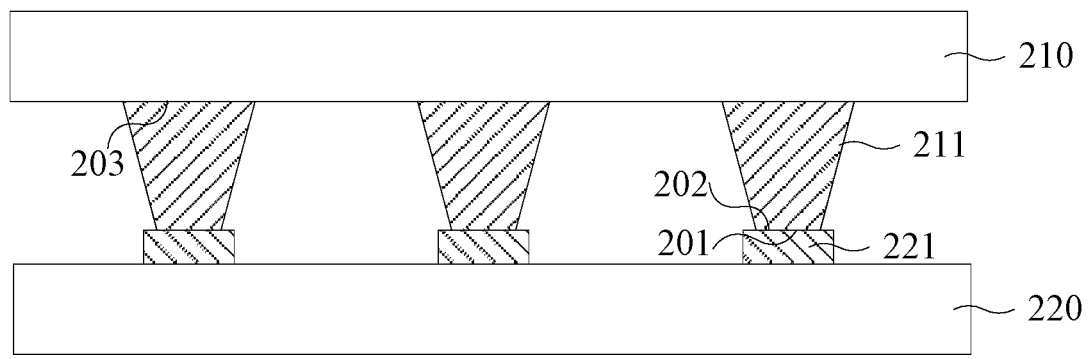
FIG. 3 is a schematic structural view of another display panel along the dashed line AB in FIG. 1.

FIG. 3 is a schematic structural diagram of another display panel along the dashed line AB in FIG. 1. The structure of the display panel shown in FIG. 3 is similar to that of the display panel shown in FIG. 2 except that the surface of the supporting spacer 211 close to the protrusion 221 is defined as a second contact surface 202, and the vertical projection of the second contact surface 202 on the first substrate 210 is located in the vertical projection of the first contact surface 201 on the first substrate 210.

It should be noted that, in the display panel shown in FIG. 3, the area of the contact interface between the supporting spacer 211 and the second substrate 220 is equal to the area of the second contact surface 202. Therefore, when the same pressing force is applied, the intensity of the pressure acting on the display panel is the same as that acting on the display panel of the prior art, and it would not affect the normal operation of the display panel, so that there is no need to adjust the number of the supporting spacers 211.

It should also be noted that, as shown in FIG. 2 and FIG. 3, a surface of the supporting spacer 211 opposite to the second contact surface 202 is defined as a first opposing surface 203. For the frustum supporting spacer shown in FIG. 2 and FIG. 3, the area of the first opposing surface 203 may be larger than the area of the second contact surface 202 and the area of the first contact surface 201. When the area of the first contact surface 201 is larger than the area of the second contact surface 202, the area of the first opposing surface 203 may also be smaller than the area of the first contact surface 201, which is not specifically limited in this embodiment.

Figure 4:
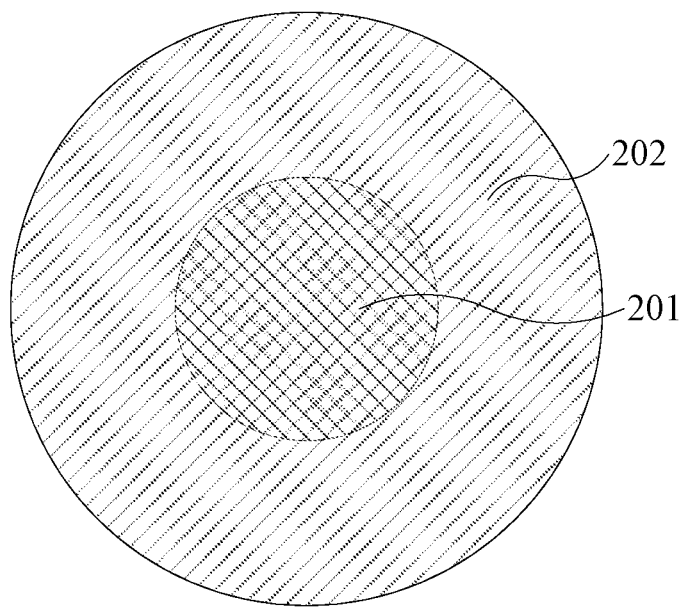
FIG. 4 is a diagram showing a relative position of the first contact surface and the second contact surface in FIG. 2.
Figure 5:
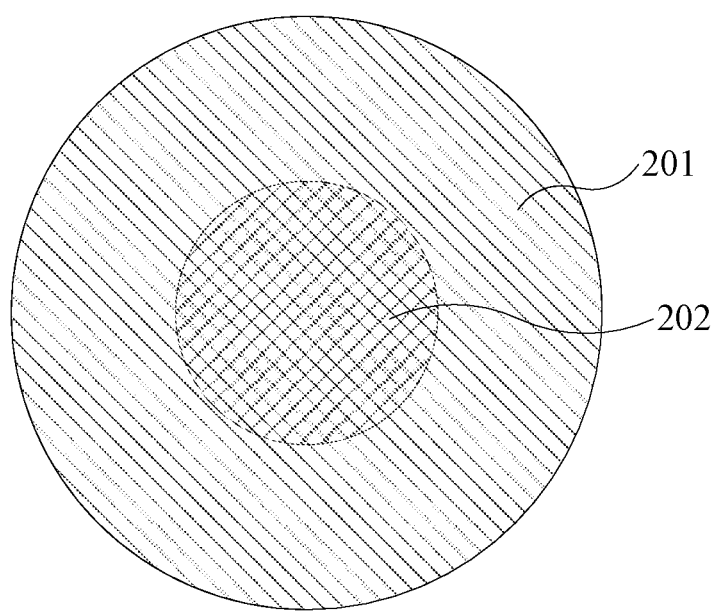
FIG. 5 is a diagram showing a relative position of the first contact surface and the second contact surface in FIG. 3.

FIG. 4 is diagram showing a relative position of the first contact surface and the second contact surface in FIG. 2. FIG. 5 is diagram showing a relative position of the first contact surface and the second contact surface as illustrated in FIG. 3. As shown in FIG. 4 and FIG. 5, the shape of the first contact surface 201 may be the same as the shape of the second contact surface 202. In such an embodiment, the area of the contact interface between the supporting spacer 211 and the second substrate 220 (that is the contact part between the first contact surface 201 and the second contact surface 202) will not be changed when the alignment between the first substrate 210 and the second substrate 220 has a small deviation, thereby largely ensuring that the intensity of the pressure on the display panel will not be changed due to the alignment deviation. It should be noted that, in other implementations of this embodiment, the shapes of the first contact surface 201 and the second contact surface 202 may also be other shapes than circles, which is not specifically limited in this embodiment.

Figure 6:
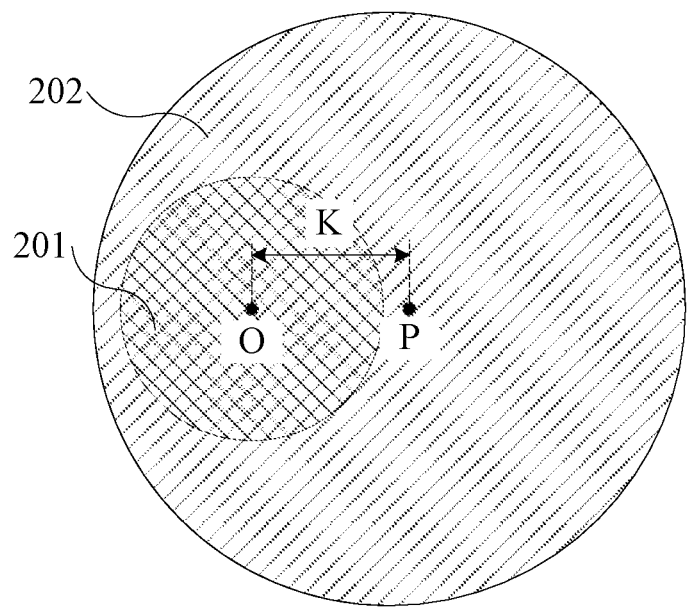
FIG. 6 is a diagram showing another relative position of the first contact surface and the second contact surface in FIG. 2.
Figure 7:
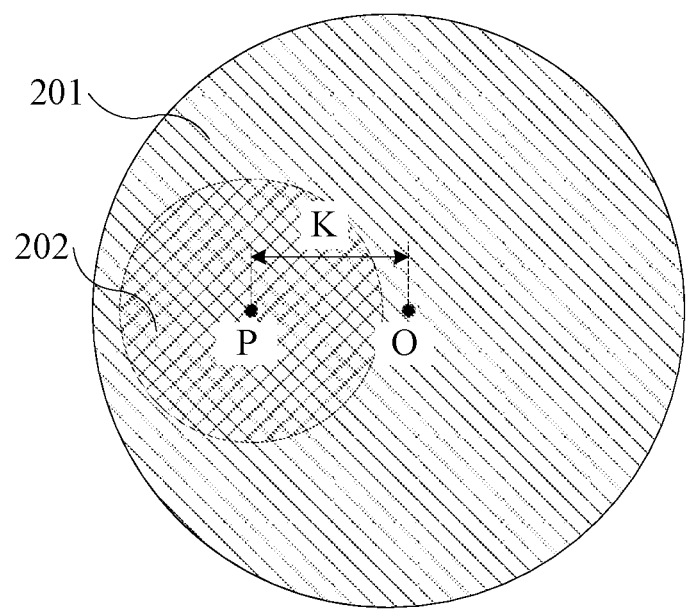
FIG. 7 is a diagram showing another relative position of the first contact surface and the second contact surface in FIG. 3.

FIG. 6 is a diagram showing another relative position of the first contact surface and the second contact surface in FIG. 2. FIG. 7 is a diagram showing another relative position of the first contact surface and the second contact surface in FIG. 3. It should be noted that FIG. 4 and FIG. 5 show the relative position of the first contact surface 201 and the second contact surface 202 without an alignment deviation between the first substrate 210 and the second substrate 220. FIG. 6 and FIG. 7 show the relative position of the first contact surface 201 and the second contact surface 202 in a case where an alignment deviation occurs between the first substrate 210 and the second substrate 220. As shown in FIG. 6 and FIG. 7, the distance K between the geometric center O of the first contact surface and the geometric center P of the second contact surface may be less than 5 μm. It should be noted that, 5 μm is a typical value of the alignment deviation between the first substrate 210 and the second substrate 220 in a conventional display panel. The smaller one of the areas of the first contact surface 201 and the second contact surface 202 is defined as the effective surface (that is, the first contact surface 201 in FIG. 6 or the second contact surface 202 in FIG. 7). The distance K between the geometric center O of the first contact surface and the geometric center P of the second contact surface is set to be less than 5 μm, so that in the case where the alignment deviation between the first substrate 210 and the second substrate 220 is no more than 5 μm, the area of the contact interface between the supporting spacer 211 and the second substrate 220 in any cases is the area of the effective surface, and hence the intensity of the pressure acting on the display panel would not be changed in the case of the alignment deviation.

In one embodiment, the root mean square roughness of the first contact surface 201 may be greater than 5 nm. It should be noted that, the roughness herein is the surface roughness of the first contact surface 201, wherein the surface roughness refers to the small pitch present in the machined surface and the uneven degree of the tiny peak-valley. The smaller the surface roughness is, the smoother the surface will be. The surface of the protrusion-free region 301 surrounding the protrusion 221 on the second substrate 220 is usually an amorphous material film and has a root mean square roughness of about 1 nm. To enable the surface roughness of the first contact surface 201 to be significantly greater than that of the protrusion-free region 301 so as to effectively increase the friction force between the supporting spacer 211 and the second substrate 220, optionally the root mean square roughness of the first contact surface 201 is greater than 5 nm in this embodiment.

Figure 8:
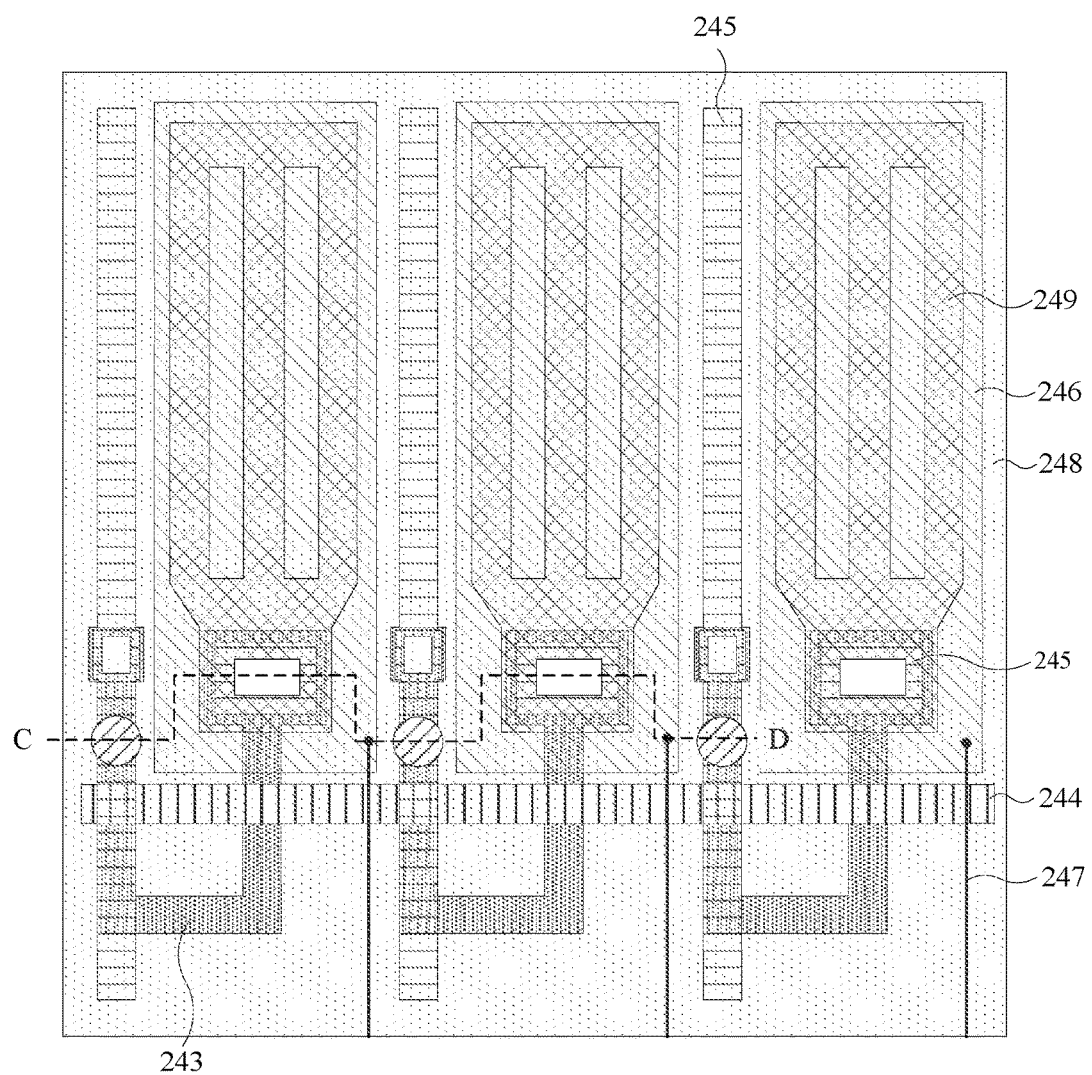
FIG. 8 is a partial structural view of the display panel in FIG. 1.
Figure 9:
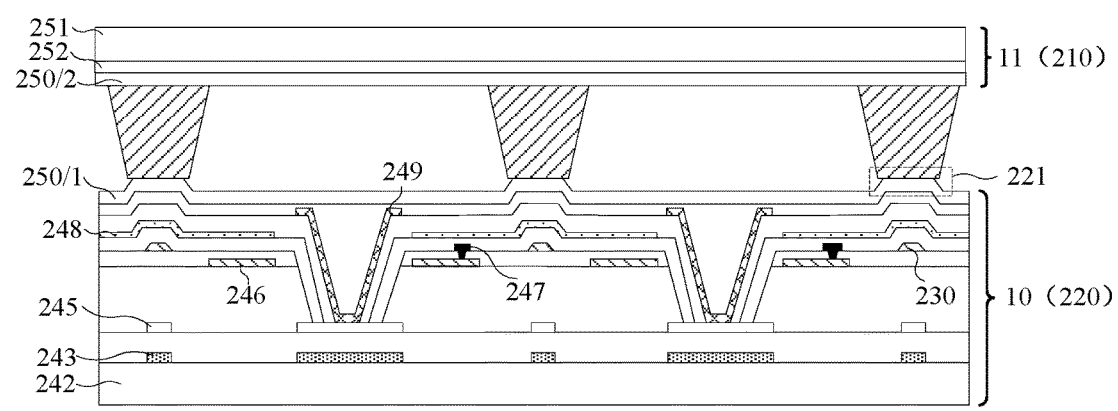
FIG. 9 is a schematic structural view of the cross-section along the dashed line CD in FIG. 8.
Figure 10:
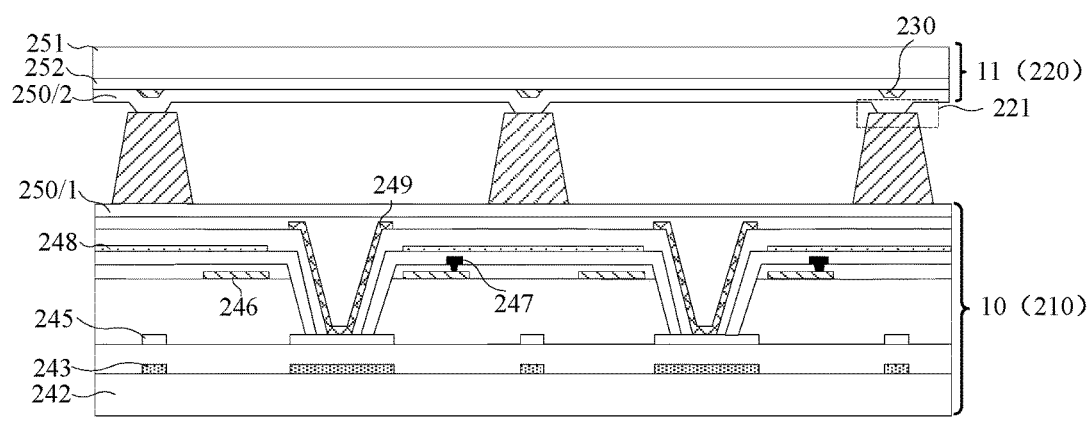
FIG. 10 is a schematic structural view of another cross-section along the dashed line CD in FIG. 8.

FIG. 8 is a partial structure diagram of the display panel in FIG. 1. FIG. 9 is a structural diagram of the cross-section along the dashed line CD in FIG. 8. FIG. 10 is a structural diagram of another cross-sectional along the dashed line CD in FIG. 8. As shown in FIGS. 8 to 10, the display panel is a liquid crystal display panel and includes an array substrate 10 (not shown in FIG. 8) and a color filter substrate 11 (not shown in FIG. 8) opposite to the array substrate 10. The array substrate 10 includes a first base substrate 242, and further includes an active layer 243, a gate metal layer 244 (not shown in FIGS. 9 and 10), a source/drain metal layer 245, a touch electrode layer 246, a touch wiring layer 247, a common electrode layer 248, a pixel electrode layer 249 and a first alignment layer 250/1 (not shown in FIG. 8) which are sequentially stacked on the first base substrate 242. The color filter substrate 11 includes a second base substrate 251 and further includes a black matrix layer 252 (not shown in FIG. 8), the color cell layer (not shown in FIGS. 8 to 10) in the same layer with the black matrix layer 252, and the second alignment layer 250/2 (not shown in FIG. 8) which are sequentially stacked on the second base substrate 251. In addition, the liquid crystal display panel further includes a liquid crystal layer (not shown in FIGS. 8 to 10) disposed between the array substrate 10 and the color filter substrate 11. When a voltage is applied to the common electrode layer 248 and the pixel electrode layer 249 the alignment orientation of the liquid crystal molecules in the liquid crystal layer changes under the action of the electric field in order to change the light transmittance of the external light source. Then the light pass through the color cell layer including the red, green and blue primary color filter films in the color filter substrate 11 to adjust the color of the light, thereby displaying a color image.

As shown in FIG. 9, the second substrate 220 may be the array substrate 10, and the first substrate 210 may be a color filter substrate 11. The second substrate 220 includes a plurality of pads 230 and at least one functional film layer located at a side of the pads 230 close to the first substrate 210. Each of the pads 230 enables the at least one functional film layer to form one of the protrusions 221.

In one embodiment, as shown in FIG. 10, the second substrate 220 is color filter substrate 11, and the first substrate 210 is array substrate 10. The second substrate 220 includes a plurality of pads 230 and at least one functional film layer located at a side of the pads 230 close to the first substrate 210. Each of the pads 230 enables the at least one functional film layer to form one of the protrusions 221.

It should be noted that, in addition to the array substrate 10 and the color filter substrate 11, the display panel shown in FIGS. 8 to 10 further includes a liquid crystal layer disposed between the array substrate 10 and the color filter substrate 11, so that the liquid crystal molecules in the liquid crystal layer have an initial alignment orientation. Each of the array substrate 10 and the color filter substrate 11 includes an alignment layer 250 disposed adjacent to the liquid crystal layer. Therefore, regardless of whether the pad 230 is disposed on the array substrate 10 or on the color filter substrate 11, the pad 230 needs to be located at the side of the alignment layer 250 away from the liquid crystal. That is, at least the alignment layer 250 in the second substrate 220 is located on the side of the plurality of pads 230 close to the first substrate 210. It should be understood that it may further include other functional layers. The protrusion 221 is formed by protruding at least one functional film by the pad 230.

In one embodiment, the surface of the pad 230 has larger particles. When the pad 230 is covered by at least one functional film with a smaller thickness, the surface at the side of at least one functional film away from the pad 230 would be functioned by the particles on the surface of the pad 230 and hence become rough, thereby achieving the beneficial effect of increasing the roughness of the first contact surface 201. Specifically, the total thickness of the at least one functional film should be less than 3 μm so as to prevent the morphology of the larger particles on the surface of the pad 230 from having no effect on the surface roughness at the side of the at least one functional film away from the pad 230.

In one embodiment, at least one functional film layer does not include an organic film layer. Since the organic film layer is relatively soft, the thickness of the organic film layer in the display panel is generally large. Therefore, in order to enable the surface at the side of the at least one functional film layer away from the pad 230 has a large roughness because of the pad 230, the at least one functional film layers does not include the organic film layer. For example, still referring to FIG. 9, the pad 230 may be disposed in the same layer as the touch wiring layer 247.

It should be noted that the pad 230 and the touch wiring layer 247 are arranged in the same layer, so that there is no need to prepare a special film space for the pad 230 so as not to increase the overall thickness of the display panel, thereby thinning the display panel. Furthermore, the pad 230 and the touch wiring layer 247 are disposed in the same layer so that the pad 230 can be formed in the same process with the touch wiring. The touch wiring is usually formed by a metal material. Therefore, the pad 230 can also be made of metal. Based on the configuration that the material of the pad 230 is metal, the pad 230 formed of a metal material can meet the requirement for the roughness of the protrusion 221 in the present embodiment, so as to increase the friction force between the supporting spacer 211 and the surface of the second substrate 220, thereby effectively lowering the drift on the baseline of the pressure sensor 101 in the display panel during the pressure detection.

It should also be noted that FIG. 9 illustrates that the pad 230 and the touch wiring layer 247 are both disposed on the array substrate 10. In other implementations of the present embodiment, the pad 230 and the touch wiring layer 247 may be both disposed on the color filter substrate 11. In such an embodiment, the color filter substrate 11 is the second substrate 220, and the substrate and the touch wiring layer 247 may be disposed in the same layer. In addition, in the configuration that the display panel is an organic light-emitting display panel, the pad 230 may be disposed in the same layer as the touch wiring layer if the touch wiring layer is disposed on the array substrate or the cover plate.

Figure 11:
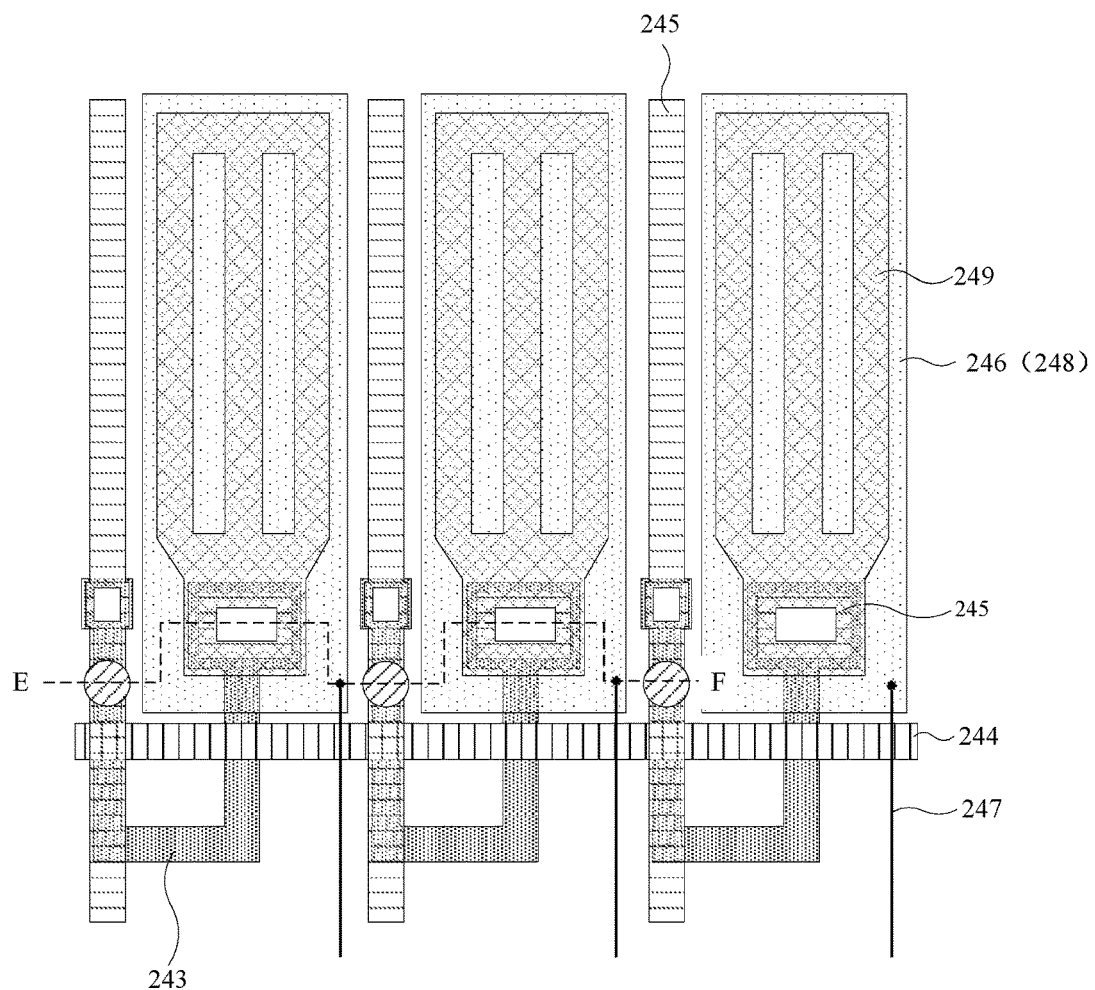
FIG. 11 is another partial structural view of the display panel in FIG. 1.
Figure 12:
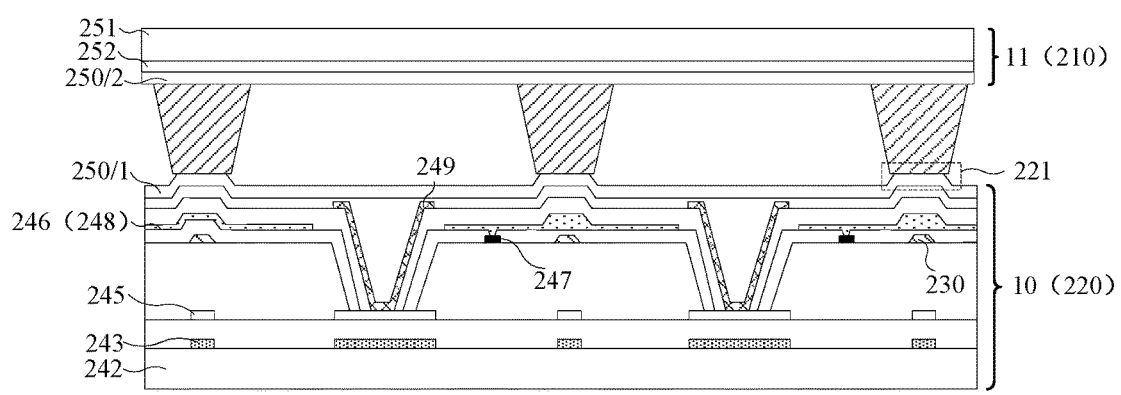
FIG. 12 is a schematic structural view of the cross-section along the dashed line EF in FIG. 11.
Figure 13:
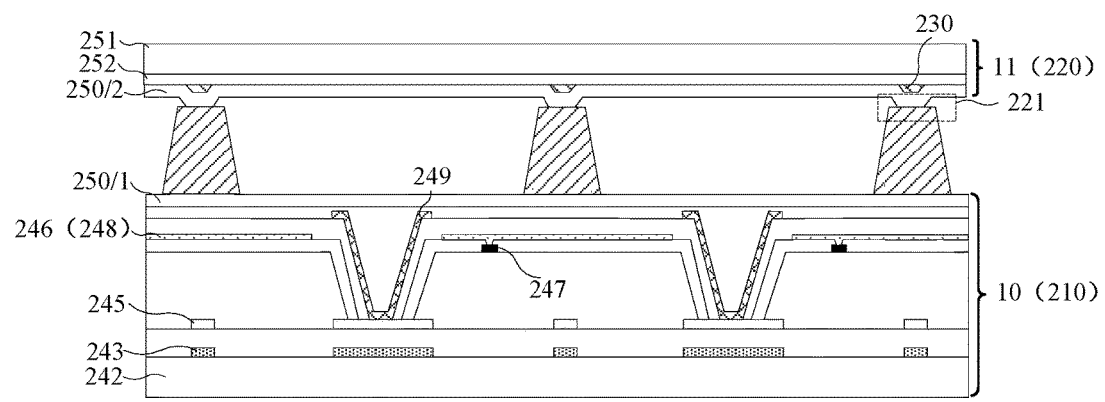
FIG. 13 is schematic structural view of another cross-section along the dashed line EF in FIG. 11.

FIG. 11 is another partial structural diagram of the display panel in FIG. 1. FIG. 12 is a schematic view of the cross-section along the dashed line EF in FIG. 11. FIG. 13 is structural view of another cross-section along the dashed line EF in FIG. 11. The structure of the display panel shown in FIG. 11 is similar to that of FIG. 8, however the common electrode layer 248 in the display panel is reused as the touch electrode layer 246 as shown in FIG. 12 and FIG. 13. In such an arrangement, it is no need to prepare a separate film space for the touch electrode layer 246, thereby thinning the display panel, and simplifying the overall structure of the display panel and the manufacturing process. In one embodiment, the touch electrode layer 246 may include a plurality of touch electrodes (not shown) arranged in an m×n array, where m and n are both integers greater than 1, and the plurality of touch electrodes performs a touch detection by means of self-capacitance in a touch phase, that is, the touch driving chip provides a touch scanning signal for the touch electrode and performs the touch detection according to the touch detection signal outputted by the touch electrode.

Figure 14:
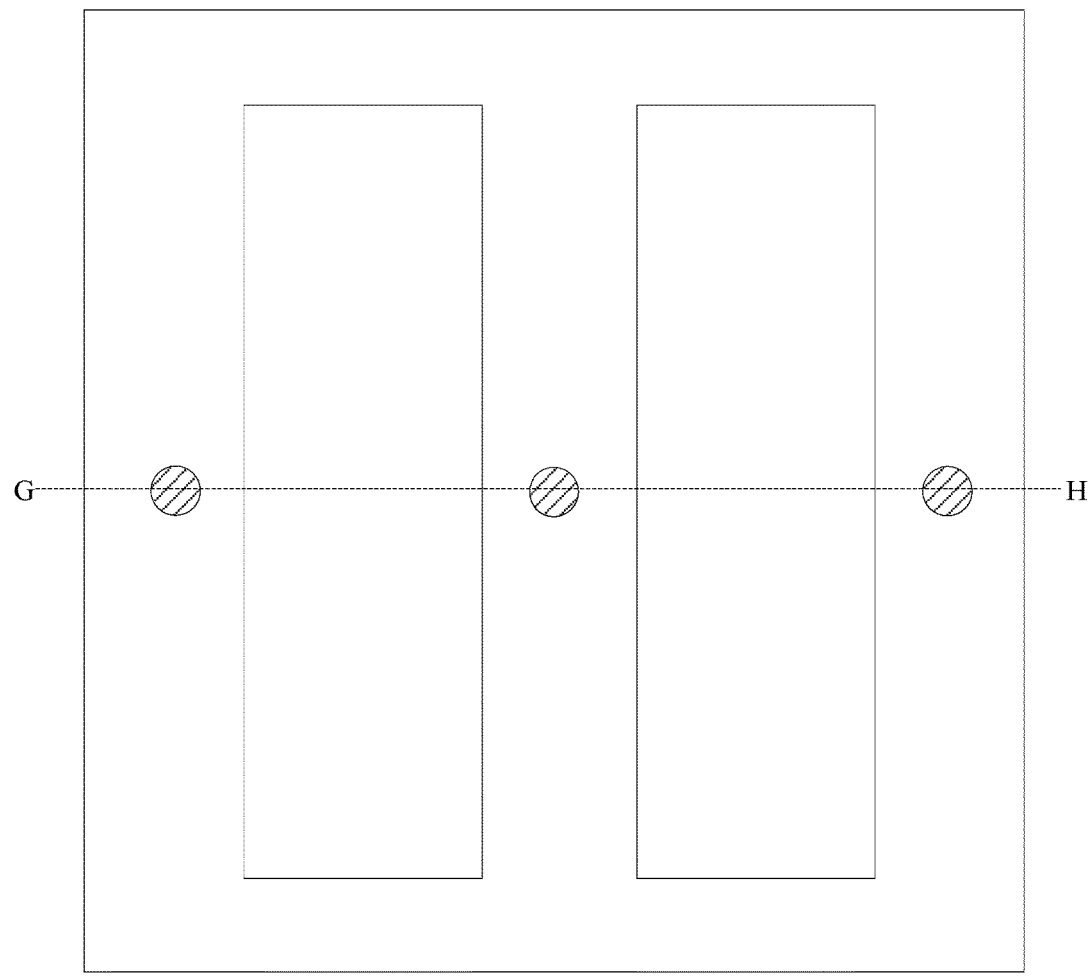
FIG. 14 is another partial structural diagram of the display panel in FIG. 1.
Figure 15:
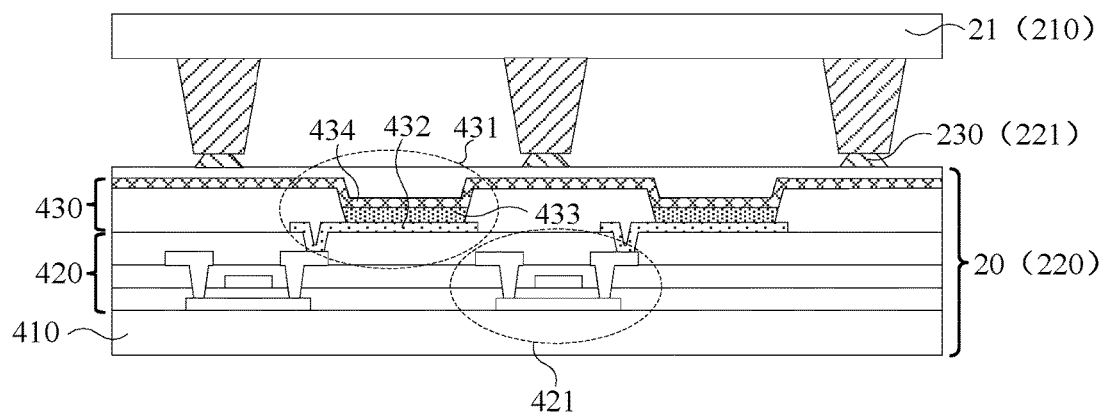
FIG. 15 is a schematic structural view of the cross-section along the dashed line EF in FIG. 14.
Figure 16:
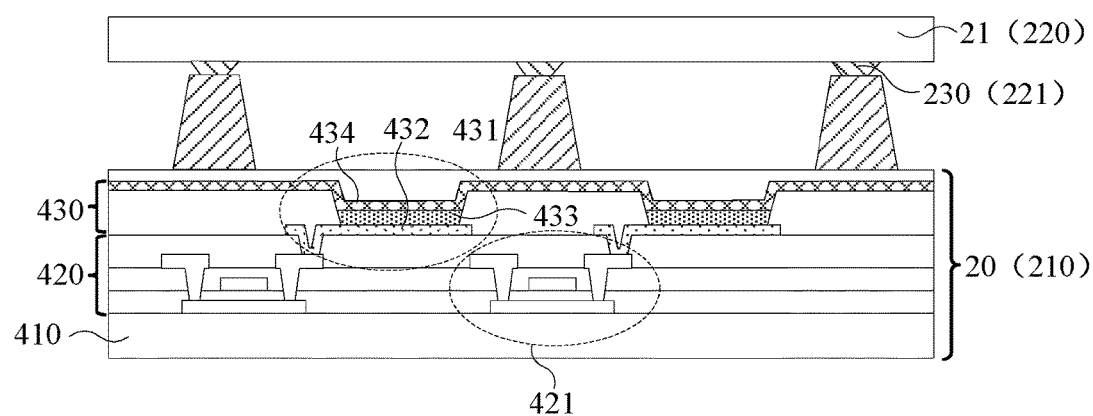
FIG. 16 is another schematic structural view of the cross-sectional along the dashed line GH in FIG. 14.

FIG. 14 is another partial structural diagram of the display panel in FIG. 1. FIG. 15 is a schematic view of the cross-section along the dashed line EF in FIG. 14. FIG. 16 is a schematic view of another cross-section along the dashed line GH in FIG. 14. As shown in FIG. 14 to FIG. 16, the display panel is an organic light-emitting display panel including an array substrate 20 (not shown in FIG. 14) and a cover plate 21 (not shown in FIG. 14) opposite to the array substrate 20. The array substrate 20 includes a third base substrate 410, a pixel driving circuit layer 420 on the third base substrate 410, and an organic light-emitting unit layer 430 on the pixel driving circuit layer 420. The organic light-emitting unit layer 430 includes a plurality of organic light-emitting units 431. Each of the organic light-emitting units 431 includes a first electrode 432, a light-emitting functional layer 433 and a second electrode 434 which are sequentially stacked. The pixel driving circuit layer 420 includes a plurality of pixels driving circuits. Each of the pixel driving circuits is connected to one of the first electrodes 432. It should be noted that the pixel driving circuit includes the driving transistor 421 and other circuit structures. Due to the limitation of the cross-sectional position, only the driving transistor 421 in each pixel driving circuit is illustrated in FIGS. 15 and 16. It should be further noted that the light-emitting functional layer 433 includes an electron transport layer, an organic light-emitting layer, a hole transport layer, an anode and a substrate. Under driven by the external voltage, holes and electrons are emitted from the first electrode 432 and the second electrode 434 via the hole transport layer and the electron transport layer and injected into the organic light-emitting layer, respectively. The holes and electrons recombine with each other in the organic layer to release and transfer energy to the molecules of the organic light-emitting substance so that they are transited from the ground state to the excited state. The excited state is very unstable, so that the excited molecules is travelled back from the excited state to the ground state, causing the radiation transition and hence producing luminescence.

As shown in FIG. 15, the second substrate 220 may be an array substrate 20. The first substrate 210 may be a cover plate 21. A plurality of pads 230 may be provided on the surface at the side of the second substrate 220 close to the first substrate 210. The pads 230 may form the protrusions 221.

In one embodiment, as shown in FIG. 16, the second substrate 220 may be a cover plate 21. The first substrate 210 may be an array substrate 20. A plurality of pads 230 may be provided on the surface at the side of the second substrate 220 close to the first substrate 210. The pads 230 may form the protrusions 221.

It should be noted that, generally, no other structure is provided between the array substrate 20 and the cover 21 in the organic light-emitting display panel. Therefore, the pad 230 which functions as the protrusion 221 may be formed directly on the surface at the side of the array substrate 20 close to the cover 21, or directly formed on the surface at the side of the cover 21 close to the array substrate 20. Large particles on the surface of the pad 230 can increase roughness of the first contact surface 201 of the protrusion 221. It can be understood that the roughness of the first contact surface 201 can be changed by adjusting the particle size on the surface of the pad 230.

In one embodiment, the material of the pad 230 may be metal or metal oxide. The diameter of the surface of the metal film and the metal oxide film is usually not less than 1 nm. Regardless of whether the protrusions 221 are directly formed or the protrusions 221 are formed by protruding other functional film, the roughness of the first contact surface 201 of the protrusion 221 is enabled to be large, thereby increasing the fiction force between the surface of the supporting spacer 211 and the surface of the second substrate 220 so as to effectively lower the drift on the baseline of the pressure sensor 101 in the display panel during pressure detection.

Figure 17:
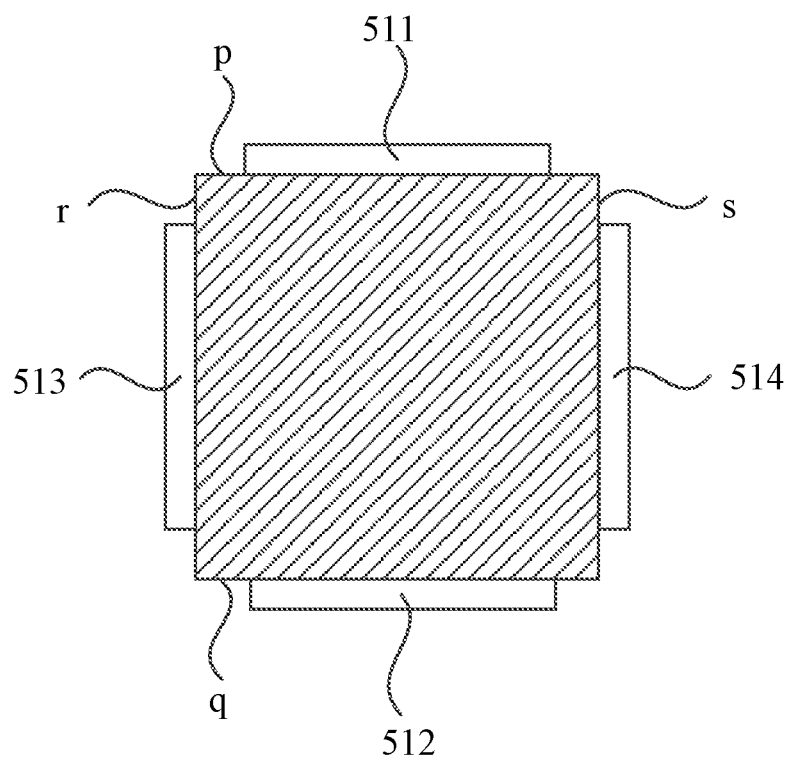
FIG. 17 is a schematic structural view of a pressure sensor according to an embodiment of the present disclosure.

FIG. 17 is an exemplary schematic structural diagram of a pressure sensor according to an embodiment of the present disclosure. Referring to FIG. 17, the pressure sensor includes a first power signal inputting terminal 511 and a second power signal inputting terminal 512. In addition, the pressure sensor further includes a first induction signal measuring terminal 513 and a second induction signal measuring terminal 514. The pressure sensor is a polygon including at least four sides, wherein the first power signal inputting terminal 511 is located on the first side p of the polygon, the second power signal inputting terminal 512 is located on the second side q of the polygon. The first power signal inputting terminal 511 and the second power signal inputting terminal 512 are used for inputting a power drive signal to the pressure sensor. The first induction signal measuring terminal 513 is located on the third side r of the polygon, and the second induction signal measuring terminal 514 is located at the fourth side s of the polygon. The first induction signal measuring terminal 513 and the second induction signal measuring terminal 514 are used for outputting a pressure-sensitive detection signal from the pressure sensor. The first straight line where the first power inputting terminal 511 and the second power inputting terminal 512 are located intersects with the second straight line where the first induction signal measuring terminal 513 and the second induction signal measuring terminal 514 are located.

Figure 18:
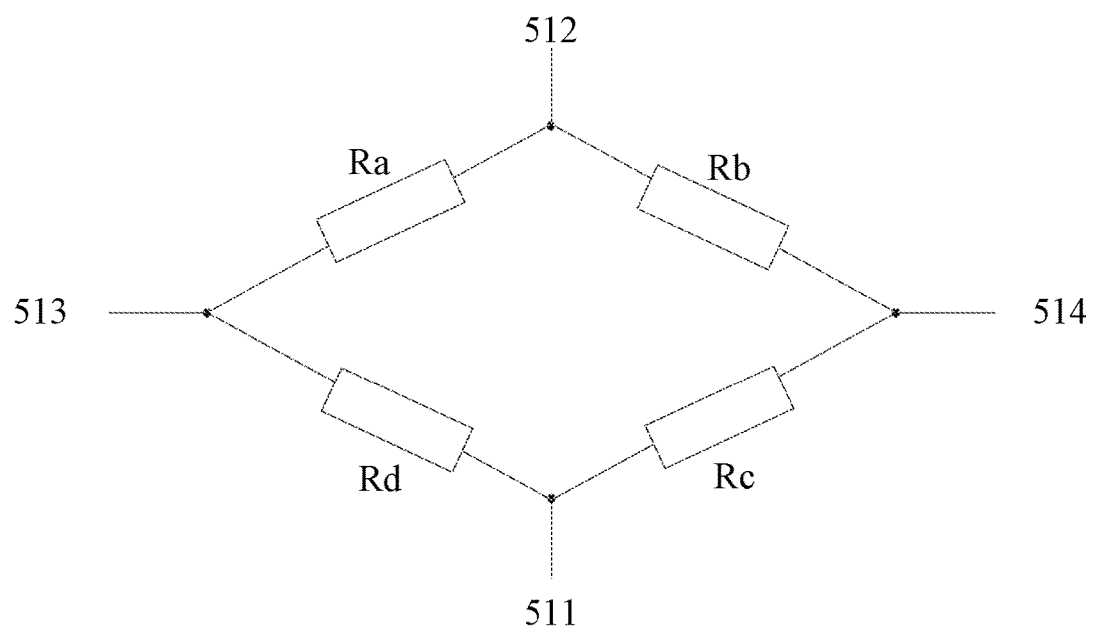
FIG. 18 is an equivalent circuit diagram of the pressure sensor of FIG. 17.

FIG. 18 is a schematic diagram for the pressure sensor shown in FIG. 17. Referring to FIG. 17 and FIG. 18, the pressure sensor may be equivalent to a Wheatstone bridge. The Wheatstone bridge includes four equivalent resistors, namely the equivalent resistor Ra, the equivalent resistor Rb, the equivalent resistor Rc and the equivalent resistor Rd respectively, wherein the equivalent resistor Ra is located between the second power signal inputting terminal 512 and the first induction signal measuring terminal 513, the equivalent resistor Rb is is located between the second power signal inputting terminal 513 and the second induction signal measuring terminal 514, the equivalent resistor Rd is located between the first power signal inputting terminal 511 and the first induction signal measuring terminal 513, and the equivalent resistor Rc is located between the first power signal inputting terminal 511 and the second induction signal measuring terminal 514. When a bias voltage signal is applied to the first power signal inputting terminal 511 and the second power signal inputting terminal 512, a current flows through each branch of the Wheatstone bridge. At this time, when the display panel is applied by a pressure, at least one of the internal equivalent resistor Ra, the equivalent resistor Rb, the equivalent resistor Rc and/or the equivalent resistor Rd changes in resistance, since the pressure sensor is affected by the shearing force from the position corresponding to the pressure sensor in the display panel, so that the difference between the pressure-sensitive detection signals outputted from the first induction signal measuring terminal 513 and the second induction signal measuring terminal 514 of the pressure sensor is different from the difference between the pressure-sensitive detection signals outputted from the first induction signal measuring terminal 513 and the second induction signal measuring terminal 514 without the applied pressure. Therefore, the magnitude of the touch pressure may be determined.

Figure 19:
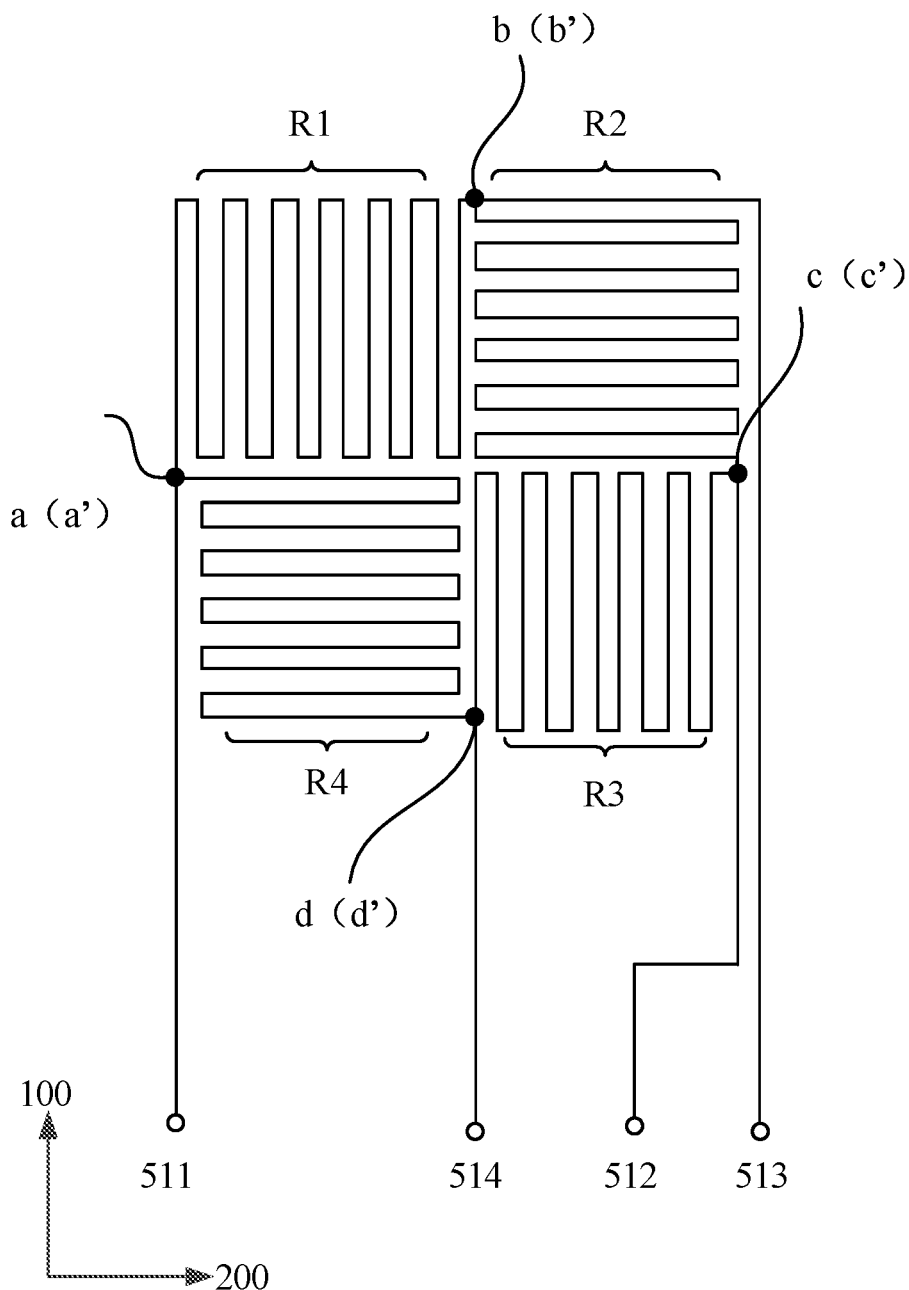
FIG. 19 is a schematic structural view of another pressure sensor according to an embodiment of the present disclosure.

FIG. 19 is a structural diagram showing another pressure sensor according to an embodiment of the present disclosure. Referring to FIG. 19, the pressure sensor includes a first power signal inputting terminal 511 and a second power signal inputting terminal 512. In addition, the pressure sensor further includes a first induction signal measuring terminal 513 and a second induction signal measuring terminal 514. The pressure sensor includes a first inductive resistor R1, a second inductive resistor R2, a third inductive resistor R3 and a fourth inductive resistor R4. The first end a of the first inductive resistor R1 and the first end a' of the fourth inductive resistor R4 are electrically connected to the first power signal inputting terminal 511. The second end b of the first inductive resistor R1 and the first end b' of the second inductive resistor R2 are electrically connected to the first induction signal measuring terminal 513. The second end d of the fourth inductive resistor R4 and the first end d' of third inductive resistor R3 are electrically connected to the second induction signal measuring terminal 514. The second end c of the second inductive resistor R2 and the second end c' of the third inductive resistor R3 are electrically connected to second power signal inputting terminal 512. The first power signal inputting terminal 511 and the second power signal inputting terminal 512 are used to input the power drive signal to the pressure sensor. The first induction signal measuring terminal 513 and the second induction signal measuring terminal 514 are used to output the pressure-sensitive detection signal from the pressure sensor.

With continued reference to FIG. 19, the Wheatstone bridge is formed by the first inductive resistor R1, the second inductive resistor R2, the third inductive resistor R3 and the fourth inductive resistor R4. When a bias voltage signal is applied to the first power signal inputting terminal terminal 511 and the second power signal inputting terminal 512, a current flows through each branch of the Wheatstone bridge. At this time, when the display panel is applied by a pressure, the internal resistors (including the internal equivalent resistor Ra, the equivalent resistor Rb, the equivalent resistor Rc and the equivalent resistor Rd) change in resistance, since the pressure sensor is affected by the shearing force from the position corresponding to the pressure sensor in the display panel, so that the difference between the electrical signals outputted from the first induction signal measuring terminal 513 and the second induction signal measuring terminal 514 of the pressure sensor is different from the difference between the electrical signals outputted from the first induction signal measuring terminal 513 and the second induction signal measuring terminal 514 without the applied pressure. Therefore, the magnitude of the touch pressure may be determined.

It should be noted that, since the Wheatstone bridge is disposed in the display panel, when pressure is applied to the display panel, the display panel is deformed, so that the first inductive resistor R1, the second inductive resistor R2, the third inductive resistor R3 and the fourth inductive resistor R4 are all deformed. In order to detect the magnitude of the touch pressure, the deformation induced in the first inductive resistor R1, the second inductive resistor R2, the third inductive resistor R3 and the fourth inductive resistor R4 should be different from each other.

In one embodiment, referring to FIG. 19, the pressure sensor further includes a first extension direction 100 and a second extension direction 200. The first extension direction 100 and second extension direction 200 are configured to be crossed with each other. The component of extension length of the first inductive resistor R1 from the first end a to the second end b in the first extension direction 100 is longer than that in the second extension direction 200, the component of extension length of the second inductive resistor R2 from the first end b' to the second end c in the second extension direction 200 is longer than that in the first extension direction 100, the component of extension length of the third inductive resistor R3 from the first end d' to the second end c' in the first extension direction 100 is longer than that in the second extension direction 200, and the component of extension length of the fourth inductive resistor R4 from the first end a' to the second end d in the second extension direction 200 is longer than that in the first extension direction 100.

In such a configuration, the strain in the first extension direction 100 may be sensed by the first inductive resistor R1 and the third inductive resistor R3, and the strain in the second extension direction 200 may be sensed by the second inductive resistor R2 and the fourth inductive resistor R4. Since the direction in which the strain is sensed by the first inductive resistor R1 is different from the direction in which the strain is sensed by the second inductive resistor R2, and the direction in which the strain is sensed by the fourth inductive resistor R4 is different from the direction in which the strain is sensed by the third inductive resistor R3, the first inductive resistor R1, the second inductive resistor R2, the third inductive resistor R3 and the fourth inductive resistor R4 may be disposed in the same position or the positions close to each other, so that the first inductive resistor R1, the second inductive resistor R2, the third inductive resistor R3 and the fourth inductive resistor R4 have synchronous temperature change, thereby eliminating the affection caused by the temperature difference and hence improving the pressure-inductive accuracy.

It should be noted that the first induction signal measuring terminal 513 and the second induction measuring terminal 514 of the pressure sensor may also be electrically connected to the external circuit and may also be the channel for transmitting static electricity to the pressure sensor, similarly as the first power signal inputting terminal 511 and the second power signal inputting terminal 512. Therefore, in addition to the first power signal inputting terminal 511 and/or the second power signal inputting terminal 512 being electrically connected to an static electricity discharging unit, the first induction signal measuring terminal 513 and/or the two induction signal measuring terminal 514 may also be electrically connected to an static electricity discharging unit.

Figure 20:
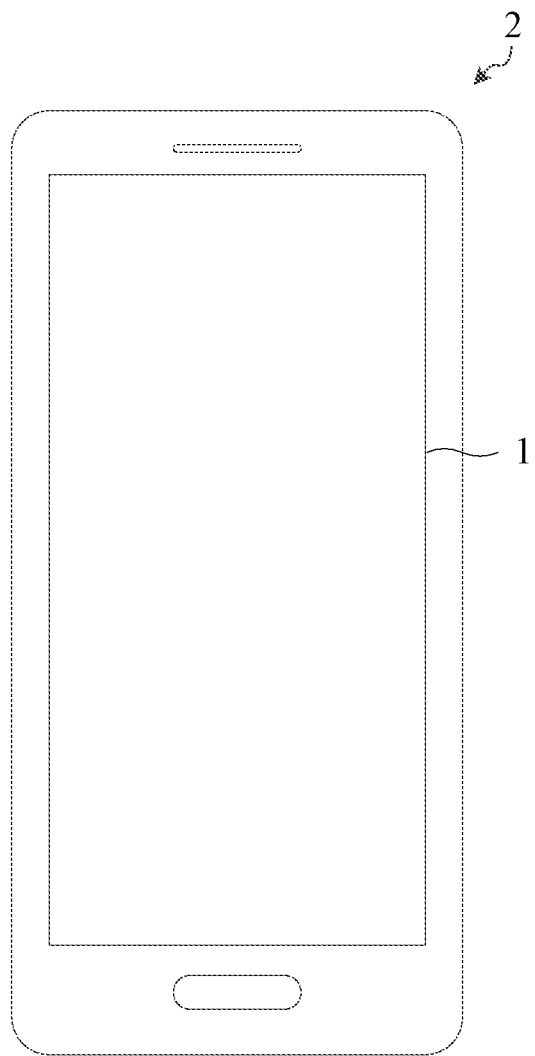
FIG. 20 is a schematic structural view of a display device according to an embodiment of the present disclosure.

FIG. 20 is a schematic structural diagram of a display device according to an embodiment of the present disclosure. As shown in FIG. 20, the display device 1 includes the display panel 2 according to any of the above embodiments of the present disclosure.

It should be noted that the above contents are only preferred embodiments of the present disclosure and its technical principles. It can be understood for those skilled in the art that the present disclosure is not limited to specific embodiments described herein. For those skilled in the art, the present disclosure may be subject to various apparent variations, readjustments and replacements without departing from a protection scope of the present disclosure. Therefore, although the present disclosure is described in detail through above embodiments, the present disclosure is not only limited to above embodiments. The present disclosure can also include more other equivalent embodiments without deviating from conceptions of the present disclosure. A scope of the present disclosure is determined by a scope of attached claims.

What is claimed is:

1. A display device, comprising:
a pressure sensor;
a first substrate on which a plurality of supporting spacers are disposed; and
a second substrate disposed opposite to the first substrate, wherein a plurality of protrusions are disposed on the second substrate, the protrusions correspond to and contact the supporting spacers, respectively, wherein a surface of the protrusion close to the corresponding supporting spacer is defined as a first contact surface, and the second substrate further comprises a protrusion-free region surrounding the protrusion, and a roughness of the first contact surface is greater than a roughness of the surface of the protrusion-free region.

2. The display panel according to claim 1, wherein a surface of the supporting spacer close to the protrusion is defined as a second contact surface, and a vertical projection of the first contact surface on the first substrate is located within a vertical projection of the second contact surface on the first substrate.

3. The display panel according to claim 1, wherein a surface of the supporting spacer close to the protrusion is defined as a second contact surface, and a vertical projection of the second contact surface on the first substrate is located within a vertical projection of the first contact surface on the first substrate.

4. The display panel according to claim 2, wherein the shape of the first contact surface is same as the shape of the second contact surface.

5. The display panel according to claim 3, wherein the shape of the first contact surface is same as the shape of the second contact surface.

6. The display panel according to claim 2, wherein the distance between the geometric center of the first contact surface and the geometric center of the second contact surface is less than 5 μm.

7. The display panel according to claim 3, wherein the distance between the geometric center of the first contact surface and the geometric center of the second contact surface is less than 5 μm.

8. The display panel according to claim 1, wherein the root mean square roughness of the first contact surface is greater than 5 nm.

9. The display panel according to claim 1, wherein the second substrate comprises a plurality of pads and at least one functional film layer located at a side of the pads close to the first substrate, wherein each of the pads enables the at least one functional film layer to form one of the protrusions.

10. The display panel according to claim 9, wherein no organic film layer is provided in the at least one functional film layer.

11. The display panel according to claim 9, wherein the second substrate is one of an array substrate and a color filter substrate, and the first substrate is the other of the array substrate and the color filter substrate.

12. The display panel according to claim 1, wherein a plurality of pads are provided on the surface at the side of the second substrate close to the first substrate, and the protrusions are formed by the pads.

13. The display panel according to claim 12, wherein the second substrate is one of an array substrate and a cover plate, and the first substrate is the other of the array substrate and the cover plate.

14. The display panel according to claim 9, wherein the pads are made of at least one of metal material and metal oxide material.

15. The display panel according to claim 12, wherein the pads are made of at least one of metal material and metal oxide material.

16. The display panel according to claim 11, wherein the second substrate comprises a touch wiring layer, and the pads are disposed in the same layer as the touch wiring layer.

17. The display panel according to claim 13, wherein the second substrate comprises a touch wiring layer, and the pads are disposed in the same layer as the touch wiring layer.

18. A display device, comprising a display panel wherein the display device comprises:
at least one pressure sensor;
a first substrate on which a plurality of supporting spacers are disposed; and
a second substrate disposed opposite to the first substrate, wherein a plurality of protrusions are disposed on the second substrate, the protrusions correspond to and contact the supporting spacers, respectively, a surface of the protrusion close to the corresponding supporting spacer is defined as a first contact surface, the second substrate further comprises a protrusion-free region surrounding the protrusion, and a roughness of the first contact surface is greater than a roughness of the surface of the protrusion-free region.

* * * * *